United States Patent [19]

Boule et al.

[11] Patent Number: 4,941,173
[45] Date of Patent: Jul. 10, 1990

[54] DEVICE AND METHOD TO RENDER SECURE THE TRANSFER OF DATA BETWEEN A VIDEOTEX TERMINAL AND A SERVER

[76] Inventors: Jean-Pierre Boule, 12 rue de la Résistance, 14540 Soliers, France; Dominique Hamel, 37 rue Lanfranc, 14000 Caen, France; Martial Menconi, Résidence Olympia, 14000 Caen, France

[21] Appl. No.: 269,592

[22] Filed: Nov. 10, 1988

[30] Foreign Application Priority Data

Nov. 13, 1987 [FR] France ............................ 87 15718

[51] Int. Cl.⁵ ............................................. H04R 1/00
[52] U.S. Cl. ........................................ 380/25; 380/23; 380/48; 380/49; 380/20
[58] Field of Search ................... 380/25, 23, 9, 48, 49, 380/20

[56] References Cited

U.S. PATENT DOCUMENTS

| | | | |
|---|---|---|---|
| 4,123,747 | 10/1978 | Lancto et al. | 380/25 |
| 4,323,921 | 4/1982 | Guillou | 380/20 |
| 4,533,948 | 8/1985 | McNamara et al. | 380/9 |
| 4,578,530 | 3/1986 | Zeidler | 380/25 |
| 4,599,489 | 7/1986 | Cargile | 380/25 |
| 4,621,326 | 11/1986 | Rawlins | 380/25 |
| 4,633,037 | 12/1986 | Serpell | 380/24 |
| 4,672,533 | 6/1987 | Noble et al. | 380/25 |
| 4,694,492 | 9/1987 | Wirstrom et al. | 380/25 |
| 4,731,842 | 3/1988 | Smith | 380/24 |
| 4,755,940 | 7/1988 | Brachtl | 380/24 |

OTHER PUBLICATIONS

"Cryptographic Key Distribution Using Composite Keys", National Telecommunications Conference, 1978, Birmingham, Alabama, Dec. 3-6, 1978, pp. 26.1.1-26.1.2.

"Bildschirmtext braucht Datensicherheit", Nachrichtentechnische Zeitschrift Niz, vol. 36, No. 8, Aug. 1983, pp. 500-504.

"Des Key Distribution and User Identification Technique Via A Public-Key Algorithm", IBM Technical Disclosure Bulletin, vol. 24, No. 7B, Dec. 1981, pp. 3913-3915.

Primary Examiner—Thomas H. Tarcza
Assistant Examiner—David Cain
Attorney, Agent, or Firm—Nixon & Vanderhye

[57] ABSTRACT

The protection of the transfer of data between a videotex terminal (TVX) and a server (SE) is carried out by means of an additional package (BA) connected to a video adaptor connector (PPI) of the terminal (TVX). In a presession embodiment, the package acts on the switching device (AIG) of the terminal by monitoring any other action on said switching equipment. The switching cabinet and the server conduct dialogue according to a predetermined sequence of operations comprising the definition of a transmitted session key encrypted in accordance with a basic key. Any anomaly occuring during this dialogue aborts the presession mode.

15 Claims, 7 Drawing Sheets

DEVICE AND METHOD TO RENDER SECURE THE TRANSFER OF DATA BETWEEN A VIDEOTEX TERMINAL AND A SERVER

FIELD OF THE INVENTION

A device and method to render secure the transfer of data between a videotex terminal and a server.

BACKGROUND OF THE INVENTION

The invention relates to the protection of the transfer of data between a videotex terminal and a server. This data concerns both access control to the server and the transmission of messages once the session is established. The invention applies to all videotex terminals, especially but not exclusively to those known under the French trade name "Minitel".

In order to control access to videotex systems faced with problems similar to those of remote data processing systems, three methods may be used. A first method is based on the recognition of an element familiar to the user and which is generally a password. However, this password is quite vulnerable to listenings and no standard terminal offers any protection against this threat. A second method is based on the recognition of an element concerning this individual, such as for example a biometric characteristic (voice, fingerprints). However, if such methods seem to be quite advantageous, they have up to now not been used owing to technical and economic reasons. A third method is finally based on the recognition of an element possessed by the individual. In this category, "smart" cards and authentication devices are the most reliable tools, since they implement a calculation algorithm enabling them to be fully identified. However, due to economic reasons, these systems do not seem to have met with the success hoped for.

The multi-services smart card requires the implementation of items of equipment which may be regarded as being complex and costly within the context of a single logical access control. In fact, this technique requires card readers to be connected to the videotex terminals for user cards, security processors for the cards of the server, and finally a dialogue software between a pairing (reader-card) on one side and a pairing (security processor-card) on the other side.

The authentication devices make it possible to reduce the cost of logical access control, but require the use of readouts and keyboards or optical sensors. Moreover, as there is no connection with the videotex terminal, the user is obliged to play the role of an interface between the authentication device and the terminal. Secondly, these devices generally use an off-line electric power supply, which renders their use even more complicated.

The present invention eliminates these drawbacks by proposing to protect access control to a server by authenticating the videotex terminal and protecting the messages exchanged between the server and the videotex terminal by means of using a straightforward device requiring no material adaptation to be made either to the terminal or the server and being less expensive than is currently the case.

The object of the invention is also to disconnect the videotex terminal in the event of any attempt to modify the data conveyed on the transmission line.

Another object of the invention is to use an additional package which can be directly plugged onto the video adapter connector of the videotex terminal without any autonomous power supply.

Another object of the invention is to allow for during the session protection, by means of encryption or by signature, of conveying of messages between this server and the videotex terminal so as to guarantee the confidentiality and/or integrity of these messages.

The invention also seeks to obtain a device whose characteristics make it possible to expand the development of videotex applications able to reach a very wide section of the general public (in terms of cost), whilst customizing the service.

SUMMARY OF THE INVENTION

Therefore, the object of the invention is to produce a device for protecting the transfer of data between firstly a videotex terminal having a switching management device between a line interface, a keyboard, a screen and a downstream connector known as a video adapter connector, and secondly a server by means of an additional package suitable for being connected onto the video adapter connector of the videotex terminal, wherein the package comprises, first encryption/decryption means and first dialogue means whereas the server comprises second encryption/decryption means and second dialogue means, the first and second dialogue means cooperating so as to allow for the transfer of said data, and wherein the package has a presession mode in which:

it acts on the switching device of the videotex terminal by monitoring any other action on said switching device, the first and second encryption/decryption means are operated by means of a predetermined basic key, the first and second dialogue means start a predetermined sequence of operations comprising the definition of a transmitted session key encrypted according to the basic key, another action on the switching device or any anomaly in the order of said sequence and/or in the result of an operation leads to the presession mode being aborted.

Advantageously, the predetermined sequence of operations includes a confidential code being entered on the keyboard by the user, the package then acting on the switching device to inihibit the linking between the line interface and the keyboard.

The session key may be generated from at least a first random number and preferably includes a first primary key generated by the second dialogue means of the server.

Advantageously, the predetermined sequence of operations includes the sending of the first primary key by the server to the package by means of the videotex terminal.

In one preferred embodiment, the package includes first storage means, whereas the server includes second storage means, both storage means comprising at least one part of said basic key.

Advantageously, the first storage means comprise frozen ROM means and EPROM means.

The EPROM means may comprise special information encrypted by the first encryption/decryption means by means of a storage key.

Preferably, the storage key is the combination of at least one initial key and an intermediate key, the initial key being stored in the frozen ROM means, whereas the intermediate key is stored in the EPROM means and is encrypted by the first encryption/decryption means using the initial key.

In a first variant of the invention, said basic key is a single key stored in both the first and the second storage means.

In this case, the session key is advantageously the combination of the first primary key and a second primary key generated by the first dialogue means of the package.

The second primary key may also be generated from a second random number which depends preferably on the time elapsed between the request to input the confidential code and actual input on the keyboard.

In this first mode embodiment, the predetermined sequence of operations preferably comprises the sending of the second primary key by the package to the server and the basic key is preferably the storage key.

In a second variant of the invention, the basic key comprises a public key stored in the second storage means and a secret key stored in the first storage means, the public and secret keys being complementary to each other.

In this case, the session key is advantageously the first primary key.

According to the invention, the additional package may also comprise a special mode activated at least at the time the package is first supplied with power, thus enabling personalized information to be stored in the package.

According to the invention, the package comprises a first display device indicating inhibition of the link between the line interface and the keyboard, as well as a second display device indicating the generation of the session key.

Advantageously, the package comprises a session mode in which the first and second dialogue means cooperate so as to allow for the exchange of messages signed or encrypted according to the session key.

In one particularly advantageous embodiment, the package is current-fed by the power supply of the videotex terminal.

The object of the invention also relates to a method for exchanging data between firstly a videotex terminal having a management switching device between the line interface, a keyboard, a screen and a downstream socket known as a video adapter connector, and secondly a server by means of an additional package suitable for being connected onto the video adapter connector of the videotex terminal, wherein the package and server are respectively provided with first and second encryption/decryption means, and wherein the package has an order-accessible presession mode wherein it acts on the switching device of the videotex terminal, wherein in said presession mode, the first and second encryption/decryption means operate by using a predetermined basic key, and wherein in said presession mode, the package and the server communicate by means of a predetermined sequence of operations comprising the definition of a transmitted presession encryption according to said basic key, whereas another action on the switching device or any anomaly in the order of said sequence and/or in the result of an operation results in the pression mode being aborted.

BRIEF DESCRIPTION OF THE DRAWINGS

The invention will be more readily understood on reading the following description with reference to the annexed drawings in which.

The annexed drawings, mainly comprising elements of a certain type, could be used, not only to more readily understand the following detailed description, but also the definition of the invention, if required.

Figure 1:
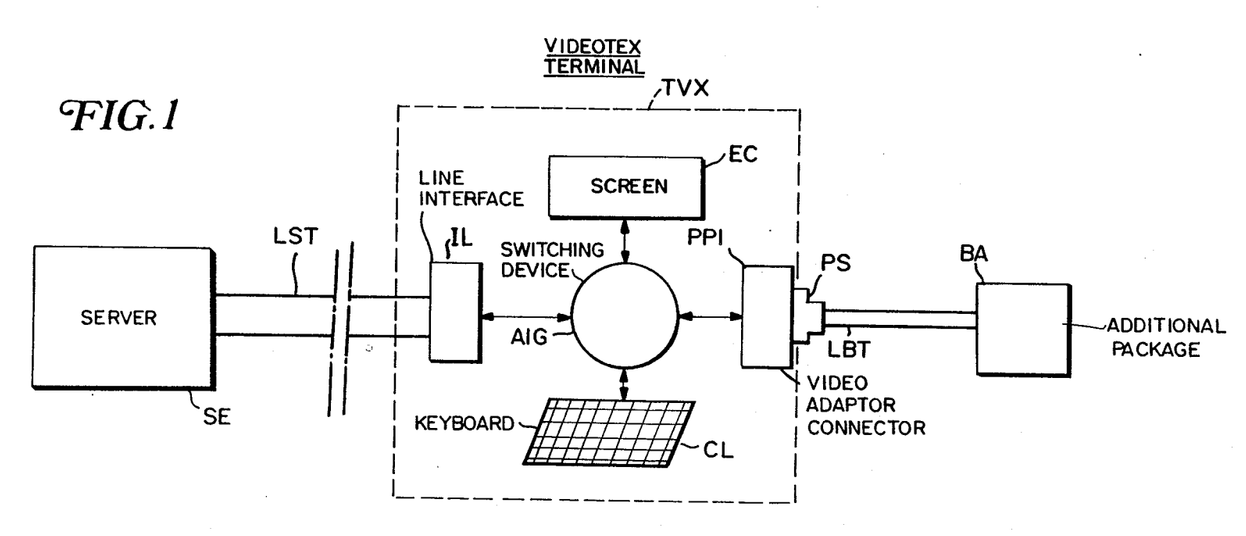
FIG. 1 is a diagram of a device according to the invention.

According to the invention the device represented on FIG. 1 comprises a server SE connected by means of a telematic line LST to a videotex terminal TVX. In the remainder of the text, the term "videotex terminal" shall be replaced by the word "terminal". The terminal TVX conventionally comprises a line interface IL, a screen EC, a keyboard CL and a video adapter connector PPI situated downstream of the link LST. These terminal elements are controlled by a switching management device AIG containing the protocol software of the terminal. According to the invention, the device comprises an additional package BA connected by means of a special socket PS by a line LBT to the video adapter connector PPI. The package BA is therefore connected downstream of the terminal as opposed to a connection upstream of the terminal, namely between the line interface IL and the server SE.

Figure 2:
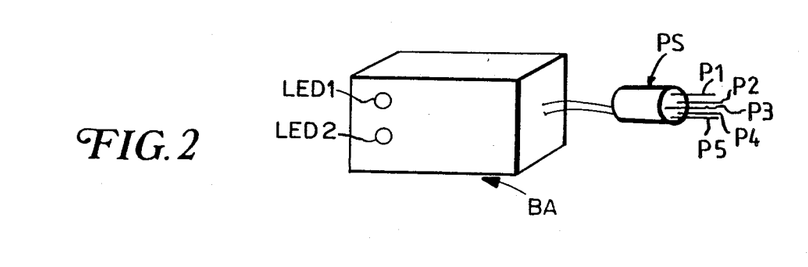
FIG. 2 is a diagram representing an embodiment of the package of the device of FIG. 1.

The package BA is represented diagrammatically in FIG. 2. This package is about 8 cm long, 3 cm wide and 2 cm deep. It comprises two light-emitting diodes LED1 and LED2 disposed in such a way that they are visible to the user when the package is plugged onto the video adapter connector by means of its special socket PS. This special socket PS comprises five pins P1 to P5 whose functions shall be specified subsequently. The PS socket makes it possible to supply the package BA with power so that it is not necessary to provide it with an off-line power supply.

Figure 3:
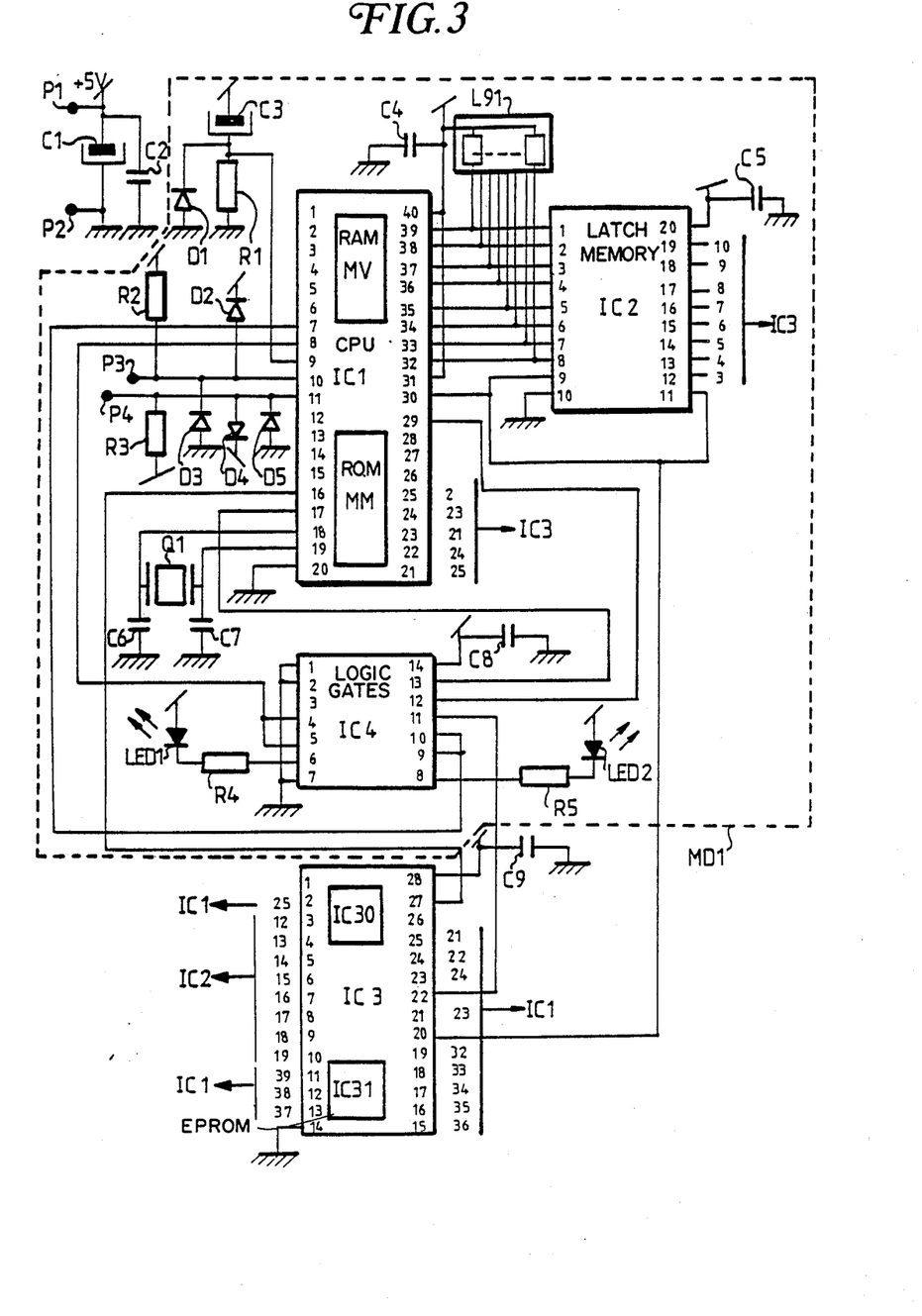
FIG. 3 is a detailed diagram of the principal elements of the additional package of FIG. 2.

The main elements of the package BA are shown on FIG. 3. The terminal P1 of the socket PS of the package BA supplies the 5 volts polarization voltage. It is connected to the ground by means of a capacitor C2 with a value of 0.1 microfads and by means of an electrolytic capacitor C1 with a value of 10 microfarads. The terminal P2 of the socket of the package BA supplies the ground reference. The socket via P5 is also connected to the ground but is not illustrated on this figure.

The package BA comprises dialogue means MDI comprising a central processing unit IC1 timed by a clock QI. The central processing unit IC1 comprises a read-write memory MV and a read-only memory MM. This read-only memory is a frozen memory, i.e. non-programmable. This central processing unit is a microcontroller of the type available under reference 8051 offered by "INTEL", a United States Company. The frequency of the clock Q1 is 10 MHz. The terminals 18, 19 of the central processing unit IC1 are connected to the terminals of the clock Q1 and respectively to the ground by means of two capacitors C6 and C7 with a value of 22 pico-farads. The terminals 32 to 39 of the central processing unit IC1 are connected respectively to the terminals 8 to 1 of a latch-memory IC2. This latch-memory is IC2 of the type available under reference 8282 from the "INTEL" Company. The terminals 1 to 8 of the latch-memory IC2 are also connected to the 5 volt polarization voltage by means of a circuit L91 placed under high impedance constituted by resistors with a value of 10 kiloohms. The terminal 31 of the central processing unit IC1 is connected to the +5 volts polarization voltage, as well to the ground through a capacitor C4 with a value of 10 nanofarads. The terminal 30 of the central processing unit IC1 is connected to the terminals 9 and 11 of the latch-memory IC2.

The terminal 9 of the central processing unit IC1 is connected to the polarization voltage by means of an electrolytic capacitor C3 with a value of 10 microfarads and to the ground by means of a resistor R1 (5.6 kiloohms) in parallel with a diode D1 of the type available under the reference IN4148 from the French company, "SILEC". The other diodes hereinafter quoted in the text shall be identical to the diode D1. The terminals 10 and 11 of the central processing unit IC1 are connected respectively to the terminals P3 and P4 of the output socket of the package BA. The terminal P3 constitutes the transmission terminal, whereas the terminal P4 constitutes the receiving terminal. The terminal 10 is connected to the polarization voltage by means of a resistor R2 with a value of 5.2 kiloohms and a safety diode D2. The terminal 10 is also connected to the ground by means of another safety diode D3. Similarly, the terminal 11 is connected to the polarization voltage by means of a 5.6 kiloohms resistor R3 and a safety diode D4 as long as it is connected to the ground by means of a safety diode D5.

The package BA comprises also a read-only memory IC3 and a set of "AND" logical gates IC4. The IC3 memory is of the type available under the reference 2864 from the "INTEL" Company and the IC4 set is of the type available under the reference 7408 from the "TEXAS INSTRUMENT" United States company. The terminals 12 to 19 of the latch-memory IC2 are respectively connected to the terminals 3 to 10 of the memory IC3. The terminals 2, 11 to 13, 15 to 19 and 21 to 25 of the memory IC3 are respectively connected to terminals 25, 39 to 37, 36 to 32, 23, 24, 22 and 21 of the central processing unit IC1. The terminal 28 of the memory IC3 is connected firstly to the polarization voltage, and secondly to the ground through a 10 nanofarad capacitor C9. The terminals 14 and 27 of the memory IC3 are respectively connected to the ground and to the terminal 16 of the central processing unit IC1.

The set of logical gates IC4 controls the light-emitting diode LED1 by means of a resistor R4 with a value of 470 ohms connected to its terminal 6 and the second light-emitting diode LED2 by means of a resistor R5 with an equal value of 470 ohms connected to the terminal 8. The diode LED1 is red and constitutes a first display device, whereas the diode LED2 is green and constitutes a second display device. The terminal 14 of the unit IC4 is connected to the 5 volts polarization voltage and to the ground through a capacitor C8 with a value of 10 nanofarads. The terminals 1, 2 and 7 are connected to the ground, the terminals 4 and 5 to the terminal 8 of the central processing unit IC1, the terminals 9 and 10 to the terminal 7 of the central processing unit IC1 and the terminals 12 and 13 respectively to the terminals 29 and 17 of the central processing unit.

The central processing unit IC1 comprises two encryption/decryption algorithms which, as regards the first one, is a "DES" (DATA ENCRYPTION STANDARD) algorithm and, as regards the second one, is a "RSA" ("RIVEST SHAMIR ADLEMAN") algorithm. These two encryption algorithms form part of the first encryption/decryption means for the package BA. The "DES" and "RSA" algorithms are stored respectively in the read-only memory MM of the central processing unit IC1 and in one section IC30 of the memory IC3.

It ought to be mentioned here that the "DES" encryption/decryption algorithm operates from a basic key KB. Moreover, in order that the package BA and the server SE can communicate with the aid of the "DES" algorithm, it is necessary that the key KB is stored both in the package BA and the server SE. The "RSA" algorithm operates by means of a basic key which is in fact the combination of two keys dependent on each other, one being a public key KPB stored in the server and the other a secret key KBS stored in the package.

The read-only memory MM of the central processing unit IC1 moreover comprises the basic key KB required for the "DES" algorithm and the secret key KBS required for the "RSA" algorithm. Another section IC31 of memory IC3 contains, an encrytion form of the "DES" algorithm by means of the storage key KST, an authentication code I of the package BA and a confidential code CC specific to a given user.

The read-only memory MM, the read-write memory MV and the memory IC3 constitute first storage means for the package. The section IC31 of the memory IC3 constitutes programmable read-only memory means for the package BA. The read-only memory MM constitutes frozen read-only memory means for the package BA.

Of course, the selection of the microcontroller is by no means restrictive. For example, it is possible to select a microcontroller of the type available under the reference 8052 from the "INTEL" Company. In this case, the authentication code I and the confidential code would be stored in a small EPROM memory external to the microcontroller 8052, and the content of the aforesaid section IC30 would be pooled in the frozen ROM of the microcontroller 8052.

Similarly, it would be possible to choose a microcontroller of the type available under the reference 68HC11 from the "MOTOROLA" United States company. In this case, an external memory would be no longer required for storing the confidential CC and authentication codes I, since the latter would be stored in the EPROM of the microcontroller.

Similarly, the server comprises second dialogue means and second encryption/decryption means constituted either by the "DES" algorithm or by the "RSA" algorithm. The basic key KB of the "DES" algorithm is also stored in second storage means. These second storage means also comprise the public key KBP used for the "RSA" algorithm.

According to the invention, the device thus described could be able to operate either by means of the "DES" algorithm or by means of the "RSA" algorithm according to requirements, the selection of the algorithm able to be made by means of information contained in the authentication code I.

The working of the afore-described device shall now be explained by referring more particularly to FIGS. 4 to 8.

Generally speaking, the working of the package comprises two principal modes:

a presession mode in which the package will be authenticated, a session mode, which can be implemented subsequently to the presession mode, in order to protect the transfer of messages between the package, via the terminal, and the server.

The presession mode can be effected either by using the "DES" algorithm or by using the "RSA" algorithm. Advantageously, the session mode shall be executed with the "DES" algorithm. In the case of using the "DES" algorithm in the presession mode, mutual authentication takes place between the server and the package, and the basic key KB is the storage key KST.

Figure 4:
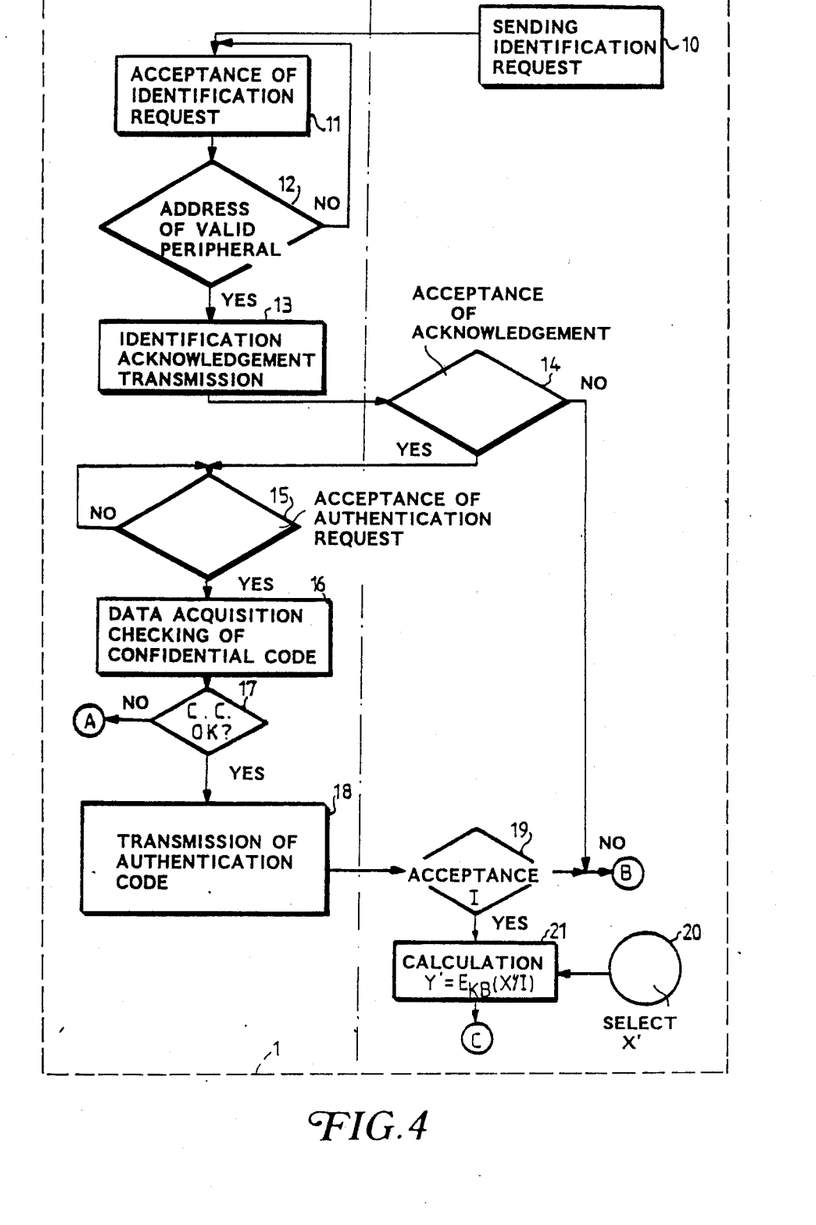
FIG. 4 is a flowchart describing the start of the presession mode of the additional package according to the invention.

The start of the presession mode is represented by the flowchart on FIG. 4, which is applied to two algorithms. The flowcharts on FIGS. 5 and 6 respectively apply to the "DES" and "RSA" algorithms and represent the two variants of the end of the presession mode.

In this presession mode, the package acts on the switching device AIG so as to configure the various switchings of the terminal. At the same time, the package monitors any other action on this switching device, namely any action whose origin is external to the package (server or third party abusive action trying to modify the switchings). Any other action, namely for example a request to modify switching not required by the package, will result in this presession mode being aborted.

Similarly in this presession mode, the package shall inhibit the linking between the keyboard of the terminal and the line interface so that no information entered by the user is able to be transmitted clearly onto the LST line. Each time this inhibition is effectively carried out, the first display means are lit up.

There now follows a description of the use of the start of the presession mode by the "DES" algorithm "DES".

After the user has typed on his terminal the code for access to the selected server, the server sends to the package in stage 10 an identification request. This identification consists of checking that the address of the package is valid. The package receives this request in stage 11, verifies in stage 12 the validity of the address and, if the latter is valid, sends in stage 13 an identification acknowledgement to the server. The latter receives this acknowledgement in stage 14 which marks the start of a predetermined sequence of operations between the first dialogue means of the package and the second dialogue means of the server.

Generally speaking, a message exchanged between the server and the package comprises a series of eight-bit bytes TVL in which each byte T indicates the type of operation, the byte V indicates the the field of the actual data, and the byte L specifies the length in bytes of the field of the data V.

After having received the acknowledgement in stage 14, the server sends an authentication request to the package. This authentication request, corresponding to a byte T equal to 01, is received by the package in stage 15 and after having acted on the switching device AIG so as to inhibit the line interface/keyboard linking, the package initializes in stage 16 a message on the screen EC requesting the user to input his confidential code CC. The user then enters his confidential code on the keyboard.

After this confidential code has been input, the package verifies in stage 17 as to whether or not it matches the data stored in the EPROM means of the package. In order to make this comparison, the encryption/decryption means decrypt the confidential code by means of the storage key KST. Where matching is correct, the package sends its identification code I in stage 18 to the server. The server receives it in stage 19 and the byte T then equals 02. The server then selects in stage 20, using an algorithm for generating a suitable random number, a random number X'. By means of this number X' of the authentication code I and the basic key KB of the "DES" algorithm, the second encryption/decryption means of the server calculate an element of cryptographical data Y' by means of the "DES" algorithm (stage 21). The number X' constitutes a first primary key whose significance shall be given subsequently.

In the rest of the text, the series of stages 10 to 21 shall be designated by the reference 1. The rest of the follchart relating to the end of the presession mode is represented on FIG. 5.

Figure 5:
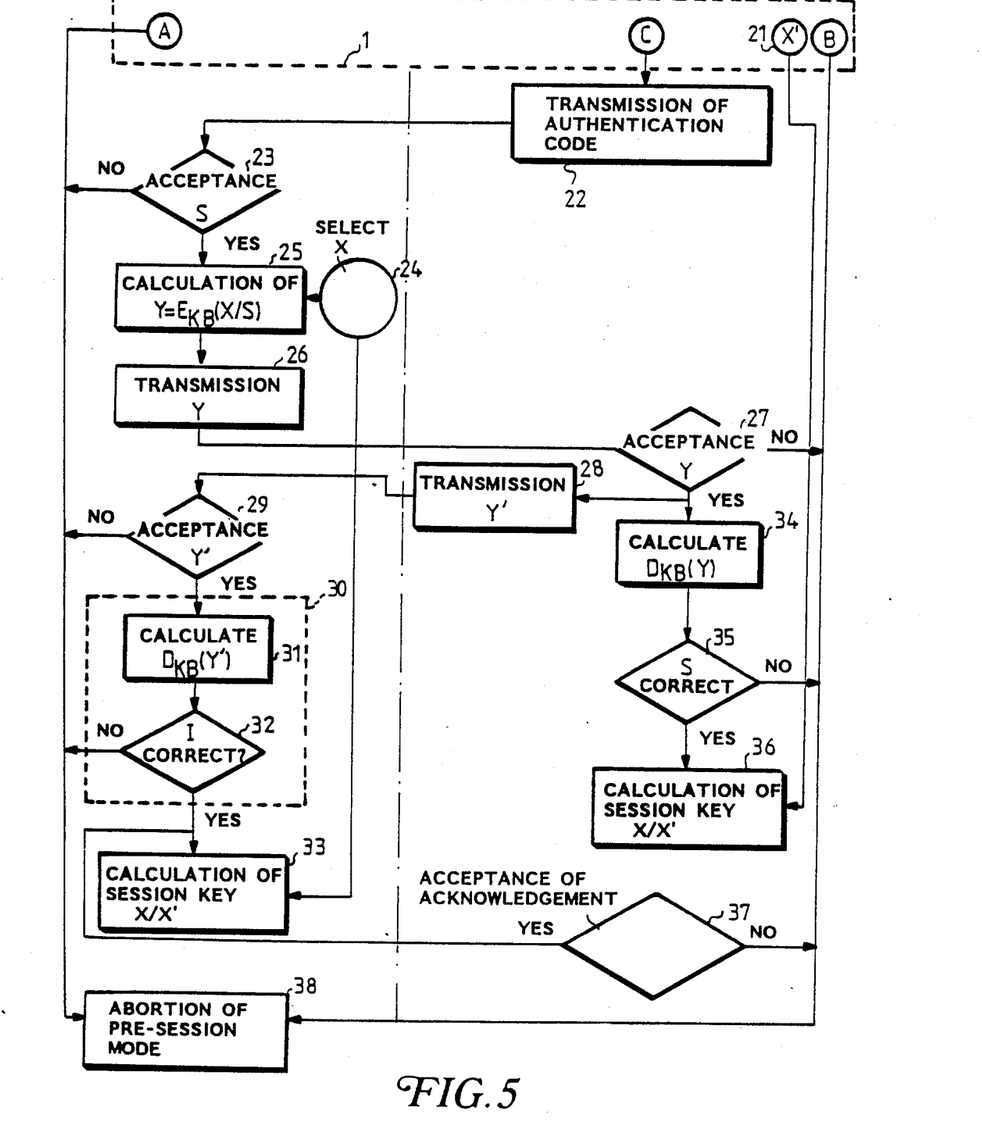
FIG. 5 is a flowchart describing a first variant embodiment of the end of the package presession mode.

After having calculated the crytographic data Y', the server sends its authentication code S, in stage 22, to the package. The latter receives it in stage 23, the byte T also having the value of 02. Upon receiving the authentication code S, the first dialogue means of the package select (stage 24) a second random number X and the first encryption/decryption means calculate an element of the cryptographic data Y by means of the "DES" algorithm, the basic key KB, the second random number X and the authentication code S (stage 25).

This second random number X, which constitutes the primary key, is generated by the first dialogue means from the time elapsed between the moment when the package has requested the user to input his confidential code and the moment when the latter has effectively input it on the keyboard.

After having determined the crytographic data Y, the package sends it in stage 26 to the server, the byte T then being 03. The server receives Y in stage 27 and then encrypts it in stage 34 by means of the "DES" algorithm by using the basic key KB. This encryption allows the server to retrieve its authentication code S and verify it. If this verification is positive, the server then obtains the second random number X, and the meeting of the first random number X' and said second random number X shall constitute the definitive session key KSS usable by the "DES" algorithm in the session mode (stage 36). Said session key KSS shall be stored in the read-write memory MV.

Before decrypting the cryptographic data Y in stage 34, the server sends the cryptographic data Y' which had been calculated in stage 21. The package receives this cryptographic data in stage 29 and decrypts it by means of the basic key KB of the "DES" algorithm. Thus in stage 31, the package retrieves its authentication code I, as well as the first random number X'. The verification of I is carried out in stage 32 and if this checking is positive, the package sends an acknowledgement which the server receives in stage 37. Afterwards, the package calculates (in stage 33) the definitive session key KSS of the "DES" algorithm which is the meeting of the random numbers X and X'. In the remainder of the text, stages 31 and 32 shall be designated by the reference 30.

Stage 37 marks the end of the presession mode of the package BA. This mode end is marked by the activation of the second display means LED2. In this presession mode, an anomaly concerning the input of the confidential code in stage 17 provokes the display of a message on the screen indicating that the confidential code is wrong. The user can enter three incorrect messages. If the confidential code is still wrong after these three messages, the presession mode is aborted in stage 38. Similarly, throughout this presession mode, it is important that the sequence of predetermined operations is carried out in the required order. This order is represented by the ascending values 01, 02, 03 of the byte T. If the package or the server receives a byte of a given value without having received the byte with the preceding value, the presession mode is also aborted in stage 38. Finally, an anomaly in the result of an operation causes the presession mode to be aborted. Such an anomaly may be the mismatching of the authentication code I received with the one stored (stage 32).

If the presession mode is carried out correctly, the server and the package mutually identify themselves and the package can move into its session mode. The user can therefore send the server (and reciprocally) ciphered or signed messages. These messages shall be ciphered or signed by means of the "DES" algorithm using the session key KSS.

In the case when the user or server does not wish to transmit any ciphered or signed messages, these messages are therefore transmitted in plain language on the line LST and the package BA is then "transparent" in relation to the terminal as long as a encryption or signature is not required.

On the other hand, in the session mode, the server can request the package to carry out a ciphered data input of the data typed on the keyboard by the user. In this case, upon receiving such a message, characterized by a byte T equal to 04 and a byte L equal to 01, the package will act on the switching device AIG so as that the latter in plain language inhibits the output on the line TST of the data typed on the keyboard by the user. This data shall be previously ciphered by the "DES" algorithm before they are sent onto the line LST. An example of an element of data to be entered ciphered may be the amount of a transaction in the case of a home banking service. Therefore, the confidentiality of this transaction is saved. The server may also send ciphered information (for example a bank account statement) on the line LST and said information shall be deciphered by means of the "DES" algorithm and the session key KSS.

Sometimes, it may not be necessary to cipher a message, but on the other hand it may be necessary to verify the entireness of said message when it is received. This is why the server and/or the package are able to sign the messages transmitted.

A message containing several blocks of eight bytes of data is signed in the following way: the first block is firstly sent in plain language onto the line LST, and secondly is ciphered by means of the "DES" algorithm; the second block is firstly sent in plain language onto the line LST subsequent to the first block, and secondly is compared, for example in a logical "OR EXCLUSIVE" gate with the first ciphered block, with the result of this comparison being in turn ciphered by the "DES" algorithm. The process is repeated until all the message blocks are sent. The final signature is then sent onto the line LST. Upon receiving the message, the server or the package, proceeding according to the same method, verifies the signature and thus ensures that the message is received in its entirety. The announcement of a signed message is characterized by the fact the byte T takes the value 05.

In the session mode, the package can indifferently receive either a message referenced by a byte T equal to 4, or a message referenced by a byte T equal to 5. In this session mode of the package, any attempt by a computer hacker to interfere with the switching control of the terminal results in the session mode being aborted and the package being disconnected. This disconnection may also be obtained by a request for disconnection from the user or server. The session key is then cleared and shall be replaced by another key during a future session.

Figure 6:
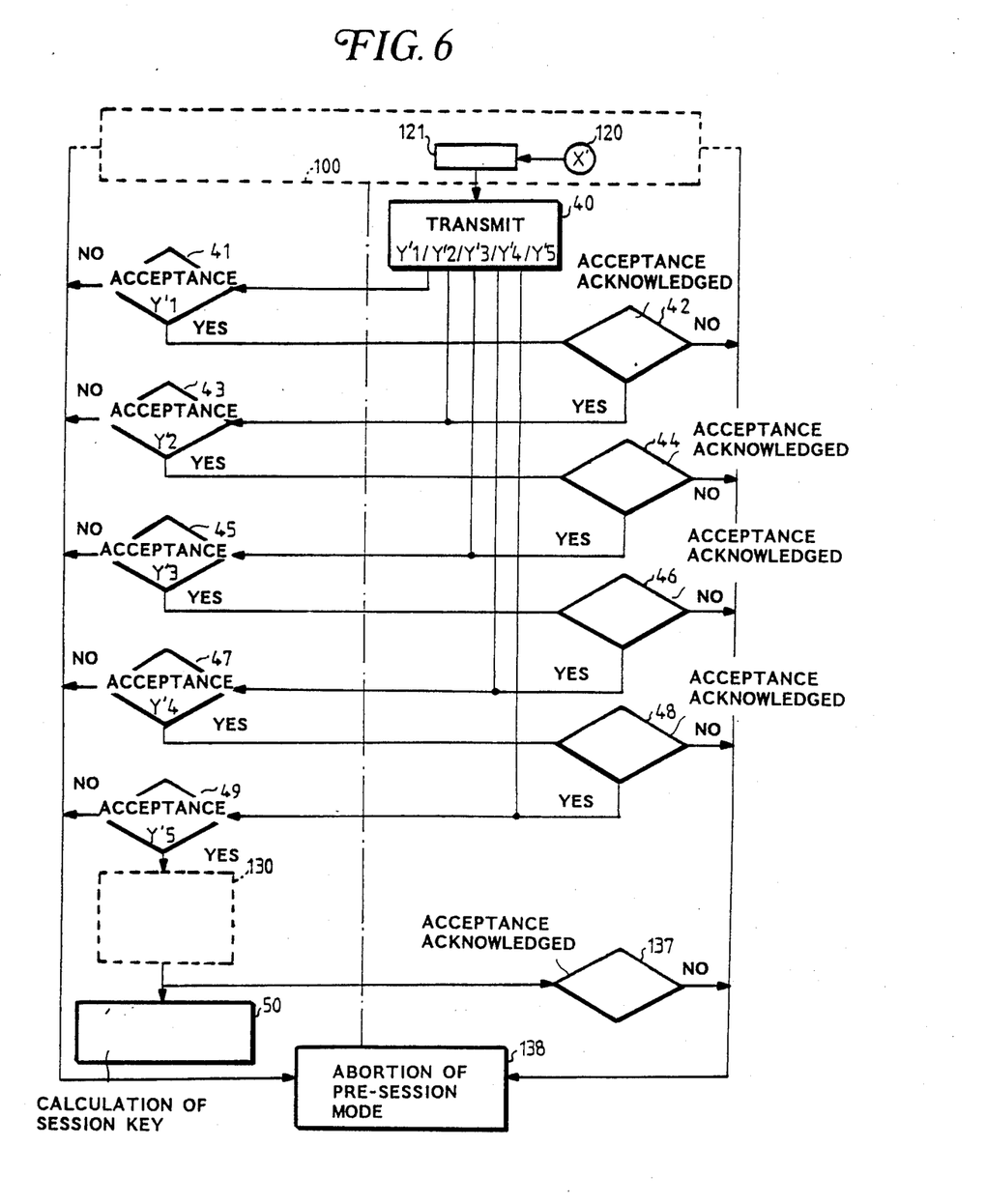
FIG. 6 is a flowchart describing a second variant of the end of the presession mode of the package.

If reference is now made to FIG. 6, this figure shows a flowchart for the functioning of the end of the presession mode of the package using the "RSA" encryption algorithm. The start of the mode can be read on FIG. 4. On FIG. 6, the analogous elements or having analogous functions with respect to those represented on FIGS. 4 and 5 shall be referenced by means of references increased by 100 with respect to the elements of FIGS. 4 and 5. Only the differences between FIG. 6 and FIGS. 4 and 5 shall be hereinafter described.

Although the "RSA" algorithm is used, the personalized data CC and I are still deciphered by the "DES" algorithm using the storage key KST.

After having carried out the series of stages of FIG. 4, the server has thus determined in stage 121 the cryptographic data Y' by means of the "DES" algorithm, the public key KBP, the package authentication code I and the random number X'. In the "RSA" algorithm version used by the Applicants, the cryptographic data is coded onto 40 bytes. As the transmission of the line LST in this mode of embodiment allows for only one eight bytes transmission, it is therefore necessary to divide the data Y' into five cryptographic data elements Y'1, Y'2, Y'3, Y'4, Y'5. The five cryptographic data elements Y'1 to Y'5 are successively sent in order to the package in stage 40. The package respectively receives these during stages 41, 43, 45, and 49 and sends to the server an acknowledgement which the latter receives in stages 42, 44, 46 and 48. Following receipt of the data Y'5 in stage 49, the first encryption/decryption means in the series of stages 130 proceed to decrypt the cryptographic data Y' by the "RSA" algorithm and the secret key KBS associated with the public key KPB.

Of course, it would be possible to use a coding mode so that the data Y' is transmitted at one go.

After having verified that the authentication code I was correct, the random number X' is thus obtained and an acknowledgement is sent to the server which the latter receives in stage 137. As the random number X' is on 32 bytes (since the authentication code I is on 8 bytes), it is necessary to carry out a compressing of said number X' in stage 50 so as to bring it back to eight bytes. This compressed number X' shall then constitute the session key KSS for the "DES" algortihm which shall be subsequently possibly used during the session mode.

Figure 7:
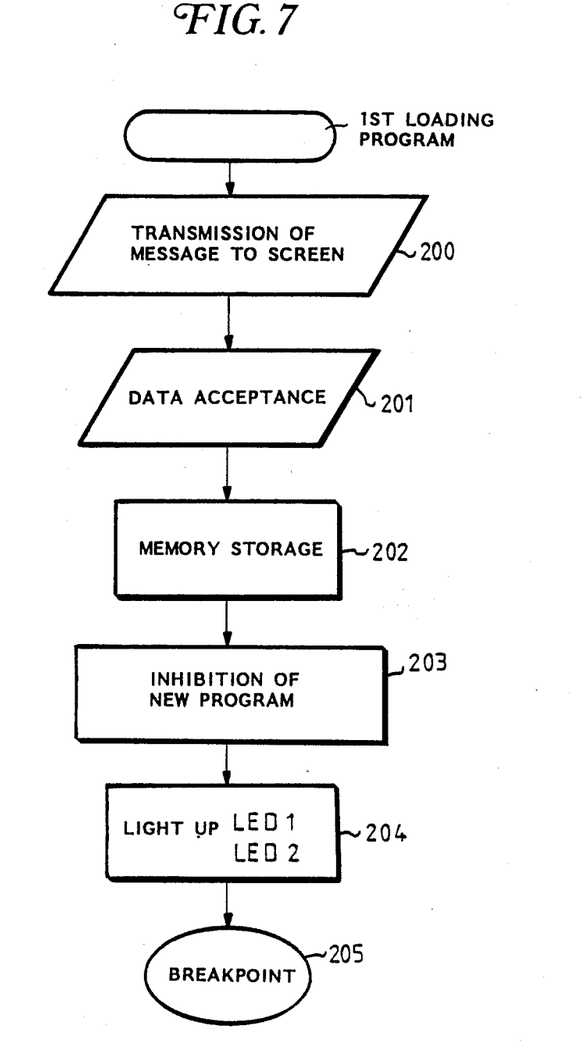
FIG. 7 is a flowchart describing a first part of the functioning of a particular mode of the package according to the invention.
Figure 8:
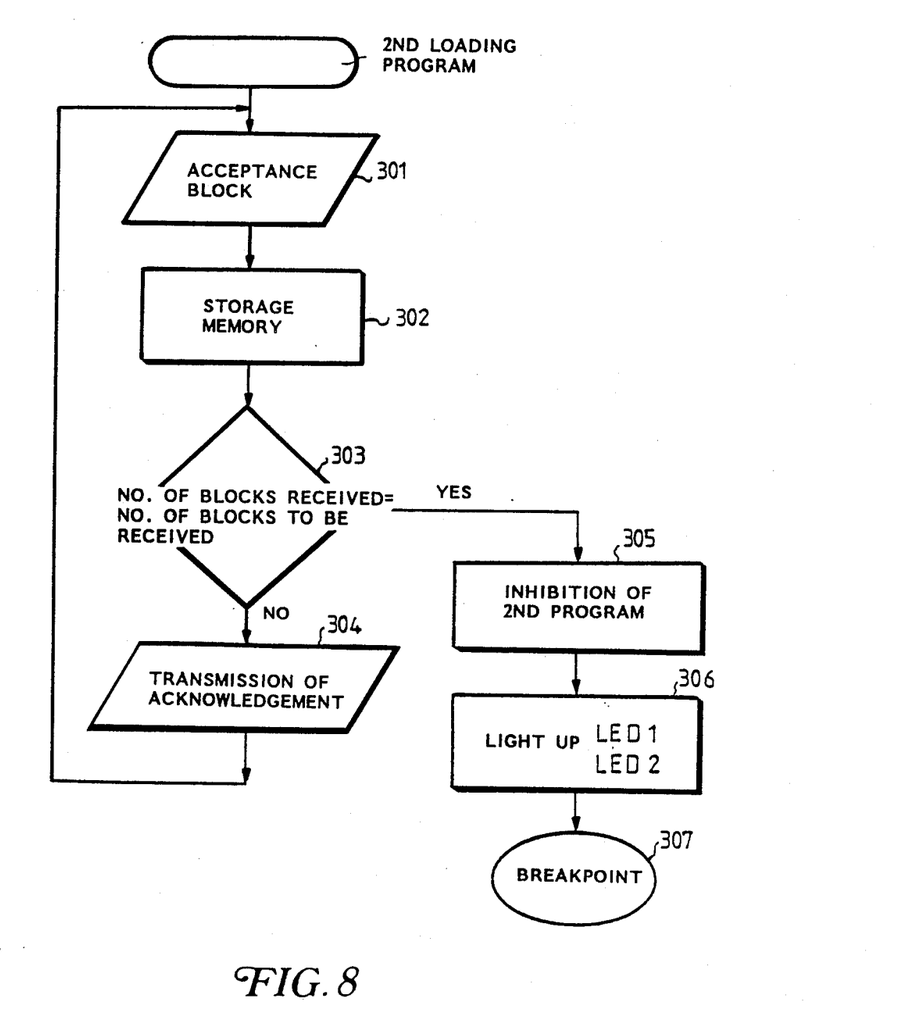
FIG. 8 is a flowchart describing a second part of the functioning of the particular mode of the package according to the invention.

There now follows a description relating a special mode for operating the device according to the invention with particular reference to FIGS. 7 and 8.

As previously seen, it was necessary that the package authentication code I, as well as the user confidential code, was stored in the REPROM IC31 means. It is therefore preferable to have a first loading program of said data into the central processing unit IC1. This first program starts up automatically as soon as the package is firstly supplied with power at an appropriate terminal equipped with a screen. A message shall be displayed on the screen requesting both the package authentication code I and confidential code of the potential user to be entered. This shall be carried out in stage 200. Stage 201 comprises reception of said data, then in stage 202, stores said data in the memory previously ciphered by the "DES" algorithm external to the package. As stage 202 is ended, stage 203 is a stage in which a new loading of the authentication and confidential codes are inhibited. Then, in stage 204 the end of data change is indicated by the functioning of the light-emitting diodes LED1 and LED2 and the stage 205 then ends the first loading program.

The second loading program, whose flowchart is represented on FIG. 8, is a program allowing the data to be input or the specific softwares to be introduced into the package. Said data and software may, for example, be a personalized telephone memento with automatic connection to the selected number or a local text editor. Said second program shall automatically start up as soon as the package is applied with power for the second time.

Although this second loading program comprises a certain number of blocks, the storage of a block in the memory IC3 is carried out in stage 302. An acknowledgement is therefore sent signifying that this block is properly stored and the operation occurs until all the blocks of the second loading program are stored in the memory. In stage 303, when the number of blocks received is equal to the number of blocks to be received, a stage 305 thus occurs identical to stage 203 inhibiting a new loading of any second program and the stage 306 indicates the end of loading of the blocks by the functioning of the diodes LED1 and LED2. Stage 307 ends said loading program. The blocks to be stored may be accompanied by a predetermined signature making it possible to check the effective storage of an authorized program.

The invention may comprise variants, especially the following:

it has previously been shown that the presession mode was initialized by the server. However, it may be possible to ensure, for example, that said mode is initialized on an order entered by the user on the keyboard of the terminal.

With the aim of providing further protection of the data exchanged and the personalized nature of the invention, it is possible to envisage that the storage key KST used by the "DES" algorithm is the combination of at least two keys. The first key or initial key KF would be masked in the frozen read-only memory MM of the microcontroller when being produced. The external memory IC31 of the microcontroller would then contain the cryptogram of an intermediate key K1. Finally, the external memory would contain the personalized data (CC, I) ciphered by the "DES" algorithm and the storage key KST.

Thus, at the time the package is used, the intermediate key K1 shall be deciphered by means of its cryptogram and the initial key KF. The storage key KST shall be then deciphered by the storage key. In the case where the "DES" algorithm is used in the presession mode, the storage key KST is the basic key KB and the session key KSS shall be transmitted ciphered according to the basic key KB, the basic key also being stored in the second storage means of the server. In the case where the "RSA" algorithm is used, the basic key is still the combination of the public key KBP and the secret key KBS.

This variant allows for a more personalization of the package, since it is possible to supply different users with packages having the same key KF, but having intermediate keys K1 and storage keys KSY appropriate for each user. Moreover, the fact that said storage key is present in the form of a cryptogram, this enables it to be stored in an external programmable read-only memory and no longer in the frozen read-only memory of the microcontroller.

Sequencing of the continuation of operations is carried out by using the byte T. This use depends on the transmission protocol. Generally speaking, each operation merely needs to be provided with a characteristic element enabling it to be identified.

Indeed, some of the afore-described means could be omitted in those variants in which they are not used; in particular, the "RSA" algorithm may not be inserted in the storage means of the package if the applications provided exclusively use the "DES" encryption.

What is claimed is:

1. Exchanging data device comprising:
   (a) a videotex terminal having a switching control device, a line interface, a keyboard, a screen, a downstream video adapter connector and a power supply,
   (b) a package connected to said video adapter connector of said videotex terminal, said package comprising first encryption/decryption means and first dialogue means constituted by:
      (i) a central processing unit acting as a microcontroller and having a transmission terminal and a receiving terminal connected to said switching control device of said videotex terminal,
      (ii) first storage means storing at least one encryption/decryption algorithm, at least one part of a basic key, a confidential code, and an authentication package code,
      (iii) voltage supplying means connected to said power supply of said videotex terminal,
   (c) a server comprising second encryption/decryption means and second dialogue means, constituted by second storage means storing said at least one encryption/decryption algorithm, at least one part of said basic key, and a server authentication code.
   (d) a telematic line connecting said videotex terminal and said server through said line interface of said videotex terminal,
   (e) said first and second encryption/decryption means of said package and said server and said first and second dialogue means of said package and said server operative in a first presession mode and in a second session mode subsequent to said presession mode,
   (f) wherein said presession mode includes:
      (i) carrying out a predetermined sequence of operations including inputting of said confidential code by a user via said keyboard of said videotex terminal, checking said confidential code in said package for validity, carrying out mutual authentication validity checks between said package and said server using said package and server authentication codes, (ii) sending from said server to said package a session key ciphered according to said basic key, said session key being then stored in said first storage means of said package, said central processing unit of said package acting on said switching control device of said videotex terminal to inhibit a linking between said keyboard and said line interface of said videotex terminal and monitoring any action on said switching control device having an origin external to said package, any such action leading to the presession mode being aborted, (g) said session mode including exchanging messages ciphered/deciphered according to said session key.

2. The device according to claim 1, wherein said package further comprises first display means indicating inhibition of a linking between said line interface and said keyboard of said videotex terminal and second display means indicating a setting up of said session key.

3. The device according to claim 1, wherein said session key is generated using at least one first random number.

4. The device according to claim 1, wherein said session key includes a first primary key generated by said server, the said predetermined sequence of operations including the sending of said primary key from said server to said package.

5. The device according to claim 1, wherein said first storage means include ROM and EPROM means, said EPROM means including special information ciphered by said first encryption/decryption means by means of a storage key.

6. The device according to claim 5, wherein said storage key is a combination of at least one initial key and one intermediate key, said initial key being stored in said ROM means, whereas said intermediate key is stored in said EPROM means, and is ciphered by said first encryption/decryption means by using said initial key.

7. The device according to claim 1, wherein said basic key is a single key stored both in said first storage means of said package and in said second storage means of said server.

8. The device according to claim 1, wherein said session key is a combination of a first primary key generated by said server and a second primary key generated by said package, said predetermined sequence of operations including the sending of said first primary key by the server to said package and the sending of the second primary key by the package to the server.

9. The device according to claim 8, wherein said first primary key is generated from a first random number and said secondary key is generated from a second random number.

10. The device according to claim 9, wherein said second random number depends on the time elapsing between the request for inputting said confidential code and the actual input onto the keyboard.

11. The device according to claim 1, wherein said basic key includes a public key stored in said second storage means of said server and a secret key stored in said first storage means of said package, the public and secret keys being complementary to each other.

12. The device according to claim 1, wherein the session key is a first primary key generated by said server.

13. The device according to claim 1, wherein said package also includes a special mode activated at least when first applying power to said videotex terminal, enabling personalized information to be stored in said package.

14. A method for exchanging data between videotex terminal having a switching control device, a keyboard, a screen and a downstream video adapter connector, and a server by means of a package connected to said video adapter connector of said videotex terminal, wherein said package and said server are provided respectively with first encryption/decryption means and second encryption/decryption means, and wherein said package operates firstly in a presession mode for controlling access to the server and subsequently in a session mode for the transmission of messages between the videotex terminal and said server once the session mode is established, wherein in said presession mode said package acts on said switching control device of said videotex terminal to establish a session mode by first authenticating the identity of the user, the package and the server, wherein the server and the package communicate using said first and second encryption/decryption means, which operate using a predetermined basic key, and wherein the server and the package communicate by a predetermined sequence of operations in accordance with a session key ciphered according to said basic key, and wherein the package monitors said switching control device for any other action on the switching control device having an origin external to the package or any other anomaly in the order of said sequence or the results of said sequence, said presession mode being aborted upon occurrence of any of the monitored conditions.

15. A method for exchanging data between a videotex terminal and a server by way of a package wherein said videotex terminal includes a switching control device, an interface line, an input device, a display device and a connector, said package connected to said connector and said server is connected to said interface line, and said package includes a first means for encrypting/decrypting using a predetermined basic key, and said server includes a second means for encrypting/decrypting using said predetermined basic key, said package and said server communicating by a predetermined sequence of operations in accordance with a session key ciphered using said basic key and said package operates in a presession mode and subsequently in a session mode, said method comprising the steps of:

operating in a presession mode by obtaining a user confidential code from said input device of said videotex terminal and checking said code for validity, carrying out mutual authentication validity checks between said package and said server using authentication codes furnished by said package and said server causing a session key to be sent from said server to said package ciphered according to said basic key, inhibiting a connection between said input device and said interface line in the presession mode, and aborting said presession mode upon detecting a failed validity check or any action on said switching control device having an origin external to said package, and wherein said session mode includes exchanging messages ciphered/deciphered according to said session key.

* * * * *